United States Patent [19]

Buckalew

[11] Patent Number: 4,738,275

[45] Date of Patent: Apr. 19, 1988

[54] CARTRIDGE PULLER FOR HOT AND COLD WATER MIXING VALVE

[76] Inventor: Joseph A. Buckalew, 6261 Crescent Ave., Buena Park, Calif. 90620

[21] Appl. No.: 832,036

[22] Filed: Feb. 21, 1986

[51] Int. Cl.$^4$ ............................................. F16K 43/00
[52] U.S. Cl. .................................. 137/315; 137/454.2; 29/214; 29/262
[58] Field of Search ................. 29/213 R, 213 E, 214, 29/254, 261, 262; 137/315, 454.2, 602, 603, 604, 625.41

[56] References Cited

U.S. PATENT DOCUMENTS

| | | | |
|---|---|---|---|
| 1,231,254 | 6/1917 | Hancock | 29/262 |
| 1,253,867 | 1/1918 | Murray | 29/214 |
| 1,331,305 | 2/1920 | Wilkinson, Jr. | 29/214 |
| 1,378,463 | 5/1921 | Johnson | 29/262 |
| 1,437,983 | 12/1922 | Magna | 29/214 |
| 1,778,802 | 10/1930 | Howell | 29/262 |
| 2,022,549 | 11/1935 | Skelton | 29/262 |
| 2,373,307 | 4/1945 | Goddard et al. | 29/213 E |
| 3,305,919 | 2/1967 | Pierce | 29/213 R |
| 3,336,652 | 8/1967 | Ullmo | 29/254 |
| 3,487,528 | 1/1970 | Shultz | 29/261 |

OTHER PUBLICATIONS

MCC Powers Process Controls, "Installation Instructions", Series 400 Hydroguard, (Model 6), Skokie, Illinois, 2 pages.

Primary Examiner—Martin P. Schwadron
Attorney, Agent, or Firm—Bogucki, Scherlacher, Mok & Roth

[57] ABSTRACT

A quick, lightweight cartridge puller for hot and cold water mixing valves operates to provide an increased mechanical force advantage while applying opposed relative forces between a valve cartridge and its value housing to avoid stressing wall and decorative material supporting the valve housing. The puller includes a clamping assembly that securely and positively engages the cartridge, a draw screw, an outer body member slidably receiving the draw screw and transmitting a reactive force to the valve housing and a puller nut which is tightened onto the draw screw to create an extremely high pulling force which quickly and easily extracts the cartridge from the housing.

15 Claims, 2 Drawing Sheets

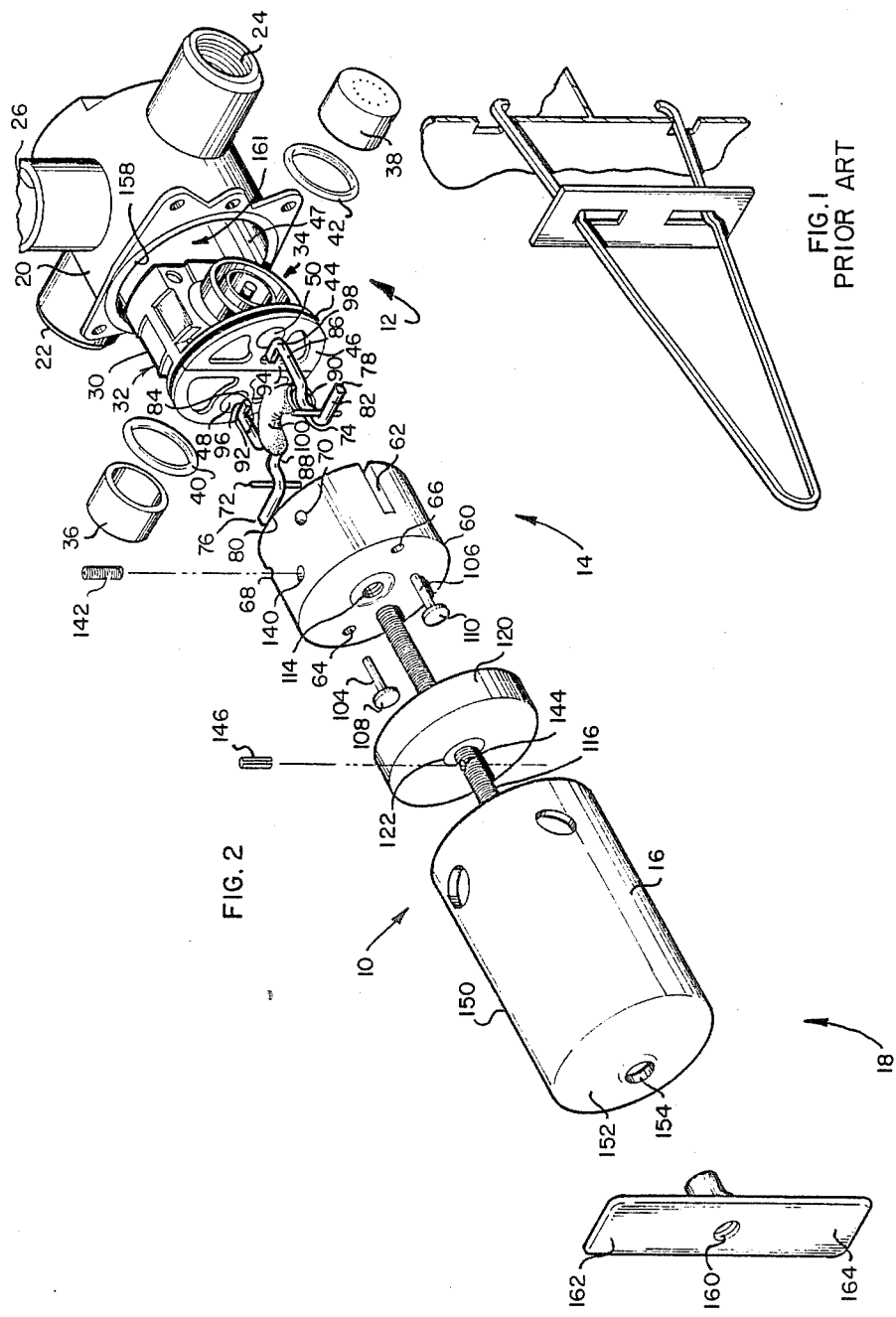

CARTRIDGE PULLER FOR HOT AND COLD WATER MIXING VALVE

BACKGROUND OF THE INVENTION

Hot and cold water mixing valves of a type which are commonly used for showers in commercial establishments such as hospitals, hotels and school athletic departments have a removable plastic balancing chamber cartridge within a metallic valve housing. One example of such a mixing valve is the "Series 400 Hydroguard" manufactured by the MCC Powers Process Controls unit of Mark Controls Corporation. The cartridge contains the operative mixing mechanism and is sealed by O-ring seals to hot and cold water inlets and a mixing water outlet within the housing.

After an extended period of operation such valves begin to leak or otherwise fail and it becomes necessary to replace the mixing cartridge. A commonly available removal tool is provided for this purpose as illustrated in FIG. 1. This tool comprises a u-shaped wire having inwardly facing hooks formed in the extremities of the legs. A slide clamp contains two apertures and is slipped over the wire toward the closed end with each aperture receiving a leg. The two hooks are inserted into two front facing holes in a cartridge that is to be removed and engage material surrounding the holes. The slide clamp is than slid toward the clamped end until it engages a small holding notch in each leg. In this position the slide clamp maintains the tool in a closed clamped position so that the tool remains clamped to the cartridge with a reasonable degree of security.

When a cartridge is first installed in a housing it slides into and out of the housing relatively easily and the removal tool is fully adequate for this function. However, after several years of operation sediment from the water builds up on the seals and the cartridge becomes very difficult to extract. Frequently, the seals will tear before they break away from the housing. The removal tool shown in FIG. 1 has been found to be completely inadequate under such circumstances. The tool is incapable of providing the required pulling force under these circumstances.

As the tool is worked the legs bend inwardly. This allows the hooks to loosen and pull back through the engagement holes without pulling the cartridge from the housing. The cartridge must then be broken up into several pieces with a hammer and chisel in order to effect removal. This frequently takes three to four hours. Even if the tool did not pull away from the cartridge it is doubtful that the ceramic tile or other decorative wall facing that supports the valve would be sufficient to withstand the pulling force required to remove the cartridge from it housing.

SUMMARY OF THE INVENTION

A quick, light weight hot and cold water mixing valve cartridge puller in accordance with the invention includes a clamping assembly, a force transformation mechanism and an outer body member. The clamping assembly includes a generally cylindrical puller body having two clamping hooks extending therefrom which positively engage and solidly hold the cartridge at two front facing apertures. A pair of press pins transmit a locking froces from a centrally threaded locking nut to the two clamp hooks to securely lock the clamp hooks. The clamp hooks are sufficiently strong and are clamped sufficiently tight to prevent bending and gradual wear of the material surrounding the cartridge apertures.

The puller assembly includes a helically threaded draw screw secured to the puller body and threadedly receiving the clamping nut as well as a puller nut. After the outer body member is slid over the draw screw and clamping assembly and into engagement with the valve housing the puller nut is screwed onto the draw screw to create relative opposing forces between the draw screw and the outer body member. The threaded coupling between the puller nut and the draw screw, together with a relatively long lever arm on the puller nut, provides a force transformation mechanism having a mechanical force advantage greater than one so that an extremely large pair of opposed forces is created with modest human effort. The opposed forces are transmitted through the outer body member to the valve housing and through the draw screw and clamping assembly to the cartridge until the forces become sufficient to draw the cartridge from the housing.

BRIEF DESCRIPTION OF THE DRAWINGS

A better understanding of the invention may be had from the following Detailed Description, taken in conjunction with the accompanying drawings in which:

FIG. 1 is a perspective view of a cartridge puller tool in accordance with the prior art;

FIG. 2 is an exploded perspective view of a cartridge puller for a hot and cold water mixing valve in accordance with the invention;

DETAILED DESCRIPTION

Figure 4:
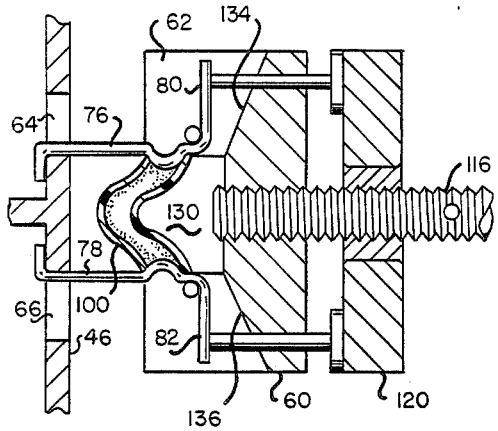
FIG. 4 is a sectional plan view of a clamping assembly used in the cartridge puller shown in FIG. 2 and take along the line 4—4 as shown in FIG. 3.

Referring now to FIG. 2, a cartridge puller 10 for a hot and cold water mixing valve 12 in accordance with the invention includes a clamping assembly 14, an outer body member 16 and a puller nut 18. The valve 12 includes a valve housing 20 having a hot water inlet 22, a cold water inlet 24 and a mixed hot and cold water outlet 26 for connection to a shower (not shown). The valve housing 20 has a hollow, generally cylindrical interior which receives a valve mixing cartridge 30 having hot and cold water inlets 32, 34 which sealingly couple to the housing 20 hot and cold water inlets 22, 24 respectively.

The hot and cold water inlets 32, 34 receive filter cartridges 36, 38 and are sealed to the housing inlets 22, 24 by o-ring seals 40, 42. A large o-ring seal 44 encircles a disk-shaped front face 46 of mixing cartridge 30 to seal the front face 46 against a mating anterior portion 47 of valve housing 12. The front face 46 has a pair of spaced apertures 48, 50 therein which may be used for gripping the cartridge 30 for insertion and removal from the housing 20. The cartridge puller 10 extends generally axially between a first end which will be referred to as a hook end which clampingly engages the mixing cartridge of 30 and an opposite puller end.

Figure 3:
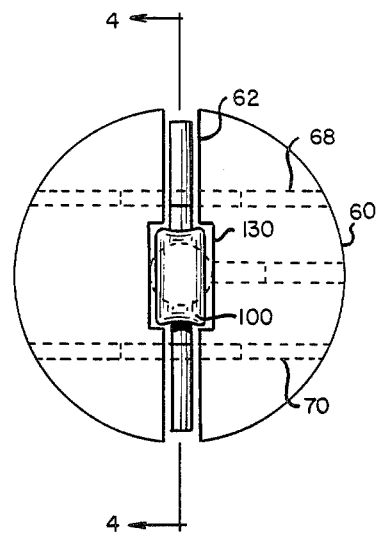
FIG. 3 is an end view of the cartridge puller shown in FIG. 2 taken from a hook end.

Making further reference to FIGS. 3 and 4, the clamping assembly 14 includes a generally cylindrical puller body having a diametrical slot 62 in a hook end thereof and diametrically spaced press pin bores 64, 66 extending axially between an opposite puller end and the slot 62. A pair of diametrically spaced, transverse pivot pin bores 68, 70 receive and support a mating pair of pivot pins 72, 74 respectively which are positioned to extend across the slot 62.

The pivot pins 72, 74 operate to pivotally retain a pair of generally L-shaped clamping hooks 76, 78. The clamping hooks 76, 78 have radially outward extending legs 80, 82 which join at interior ends thereof puller ends of axially extending legs 84, 86, respectively.

Each axially extending leg has a facing spring retainer protrusion 88, 90 formed therein partway between the two ends and preferably at a location within the notch 62 and terminates in an inward facing bend 92, 94 which forms a small hook 96, 98 respectively. In the present example the clamping hooks 76, 78 are made of spring steel and have a square cross section ⅛" on a side.

A spring bias 100 implemented as a small piece of ⅜ inch outside diameter rubber tubing arches between the clamp hooks 76, 78 with its ends engaging the spring retainer protrusions 88, 90. The spring bias 100 tends to maintain the clamp hooks 76, 78 in a spread-apart or release position.

The press pin bores 64, 66 receive respectively a pair of press pins 104, 106 having enlarged force bearing surfaces 108, 110 at puller ends thereof. The opposite, hook ends extend through the bores 64, 66 and into force transmitting engagement with the legs 80, 82 respectively.

A central, axially extending bore 114 threadedly receives and is securely attached to a hook end of a threaded draw screw 116. The draw screw 116 threadedly receives a clamping nut 120 which, when tightened onto draw screw 116 and into engagement with the force bearing surfaces 108, 110 of press pins 104, 106, pushes press pins 104, 106 axially toward the hook end of puller 10 and causes clamping hooks 76, 78 to rotate about their respective pivot pins 72, 74 and begin to close toward a clamping position. When snugly tightened the clamping nut 120 transmits a clamping force through the press pins 104, 106 to the clamping hooks 76, 78 which is sufficient to securely fasten the clamping hooks 76, 78 to the face 46 of the mixing cartridge 30. The attachment is sufficiently firm and secure to prevent movement of the clamping hooks 76, 78 within the cartridge apertures 48, 50. With movement inhibited, there is no gradual damage to or chipping away of material from the face 46 of mixing cartridge 30. The face 46 thus remains sufficiently strong to withstand even the high pulling forces required to break the sealing engagements between mixing cartridge 30 and valve housing 20 after years of normal operation.

In the present example, clamping nut 120 is reinforced by a steel "SURT NUT" hub 122. However, hub 122 is required only when clamping nut 120 is made of a relatively soft material and can normally be omitted by directly boring and tapping clamping nut 120.

The slot 62 in the clamping end of puller body 60 is generally rectangular in cross section with a somewhat enlarged rectangular central region 130 for receiving and containing the bias spring 100. The puller end of slot 62 terminates in beveled shoulders 134, 136 which engage the legs 80, 82 of clamping hooks 76, 78 and serve as stops or limits to the opening of clamping hooks 76, 78 under the force of bias spring 130 when clamping nut 120 is released. The shoulders 134, 136 are advantageously located to allow clamping hooks 76, 78 to open sufficiently wide to easily pass through apertures 64, 66 when in the limiting release position.

A set screw aperture 140 threadedly receives a set screw 142 which is screwed into engagement with the draw screw 116 to prevent removal of the draw screw 116 from the puller body 60. In addition, a diametric bore 144 slidably receives a stop pin 146 which extends slightly beyond the wall of draw screw 116 to prevent removal of clamping nut 120 from the clamping assembly 14. The bore 144 is located sufficiently distant from the clamping end of draw screw 116 to allow the clamping hooks 76, 78 to attain their full release position.

The outer body member 16 comprises a cylindrical outer shell 150 and an end wall 152 which closes the shell 150 and the puller end thereof. The inside diameter and axial length of outer shell 150 are sufficient to enable a central axially extending aperture formed within shell 150 to receive the clamping assembly 14 with a central axially extending aperture 154 in end wall 152 slidably receiving the puller end of draw screw 116 as outer body member 16 is slid over clamping assembly 16. The inside diameter and thickness of outer shell 150 are selected to cause the clamping end thereof to matingly engage a face 158 of valve housing 20 which surrounds an opening 161 through which mixing cartridge 30 is inserted and extracted.

Puller nut 18 has a threaded central aperture 160 which threadedly receives the puller end of draw screw 116 after the outer body member 16 has been slid over draw screw 116 and clamping assembly 14. Puller nut 18 has two radially extending arms which are sufficiently long to permit puller nut 160 to be tightened upon draw screw 116 with a relatively high torque. Puller nut 18 cooperates with the puller end of draw screw 116 to provide a force transformation mechanism that is able to provide a mechanical force advantage much greater than one to create relatively high opposed pulling and pushing forces between draw screw 116 and outer body member 16.

The pulling force is transmitted through draw screw 116 and clamping hooks 76, 78 of the clamping assembly 14 to cartridge 30 while the equal but opposite pushing force is transmitted through outer body member 16 to valve housing 20. A very high relatively opposed force is thus generated between the cartridge 30 and housing 20 to overcome any sticking of the seals 40, 42, 44 and extract cartridge 30 from the housing 20.

In operation, the clamping nut 120 is spun toward the pulling end of draw screw 116 until the clamping hooks 76, 78 open to the release position. This should occur as clamping nut 120 engages stop pin 146. Next, the hooks 96, 98 at the hook ends of clamping hooks 76, 78 are inserted into the apertures 48, 50 in the face 46 of mixing cartridge 30 and clamping nut 120 is spun to close the clamping hooks 76, 78 tightly and securely against interior surfaces of the bores 48, 50.

The outer body member 16 is then slid over the draw screw 116 and clamping assembly 14 with aperture 154 receiving draw screw 116 until the clamping end of outer body member 16 engages the face 158 of valve housing 20. The puller nut 18 is then spun onto draw screw 116 and tightened against the end wall 152 until mixing cartridge 30 is withdrawn from valve housing 20. Experience suggests that cartridge 30 must move only a very short distance before the seals are broken and it can be easily removed by a gentle manual pulling force.

Figure 5:
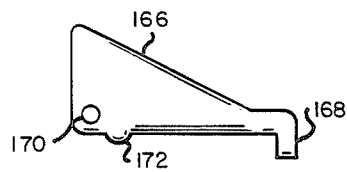
FIG. 5 is a plan view of an alternative embodiment of a hook used in the cartridge puller shown in FIG. 2.

Referring now to FIG. 5, there is shown a clamping hook 166 of alternative construction to the clamping hooks 76, 78. Clamping hook 166 has a generally right triangle shape with a hook 168 similar to hooks 96, 98 formed in the hook end thereof. A pivot hole 170 for receiving one of the pivot pins 72, 74 is placed near the right angle and a spring retainer protrusion 172 similar to the spring retainer protrusions 88, 90 is disposed along an axially extending leg. The arrangement of FIG. 5 is somewhat stronger than the arrangement of FIGS. 2-4 and facilitates manufacture of the clamping hooks from a material other than spring steel.

It will be apparent to a skilled artisan that the cartridge puller 10 can comprise a variety of materials and appear in a variety of different sizes. However, in one particularly advantages configuration the outer body member 16 was made of NYLON, had an outer diameter of 1¼ inch, an inside diameter of 1 inch and an inside bore length of 2½ inch. The aperture 154 had a diameter of ⅜ inch.

The steel draw screw had a ⅜ inch outside diameter, a length of 4½ inches and a ⅜-16 standard thread. It was tapered at the puller end to facilitate the staring of threading of puller nut 18 thereon. The press pins were made of steel with a length of ¾ inch and a diameter of 5/32 inch. The spring bias 100 was cut from ⅜ inch rubber tubing with a length of 15/16 inch. The clamping hooks 76, 78 were each 1⅛ inch long with a ¼ inch hook at one end and a 9/16 inch force leg at the other end. The wing nut was made of steel and had two 1¾ inch radially extending arms.

The puller body 60 was made of NYLON (although polyvinylchloride or other plastic is contemplated) and had an outside diameter of 1⅞ inch and a length of 4 1/32 inch. The slot 62 was ⅜ wide at the center and 3/16 inch wide at the periphery. It was 11/16 deep at the center out to a radius of ⅜ inch and then tapered along beveled shoulders 134, 136 to a depth of 1 inch at the periphery. The pivot pins 72, 74 were ⅛ inch by ½ inch long roll pins and were centered at a radius of ½ inch and 5/16 inch from the clamping end of puller body 60.

The clamping nut 120 was made of NYLON (although polyvinylchloride is contemplated for production quantities) with a diameter of 1¾ inch and an axial length of ½ inch. The center is reinforced with a ⅜ inch SURT NUT.

While there have been shown and described above various arrangements of a cartridge puller for hot and cold water mixing valves for the purpose of enabling a person skilled in the relevant art to make and use the invention, it should be clear that the invention is not limited thereto. Accordingly, any modifications, variations or equivalent arrangements within the scope of the attached claims should be considered to be within the scope of the invention.

What is claimed is:

1. A cartridge puller for extracting a valve cartridge from a valve housing through an opening therein, the cartridge puller comprising:

a clamping assembly including a threaded draw screw, a puller body affixed to a given position on the draw screw adjacent one end thereof, a pair of hooks pivotally mounted to the puller body and being pivotable between a position of engagement with the valve housing and a release position, and a clamping nut threadedly engaging the draw screw, being bidirectionally movable axially of the draw screw in response to rotation of the clamping nut relative to the draw screw and being coupled to control the pivoting of the pair of hooks between the release and engagement positions in response to the axial position of the clamping nut relative to the draw screw with a clamping force exerted on the valve cartridge by the hooks being independent of any pulling force applied to the draw screw;

an outer body adapted to engage the valve housing peripherally of the opening through which the valve cartridge is extracted; and a force transformation mechanism receiving an applied force and transforming the applied force into opposed pushing and pulling forces with a mechanical advantage greater than one, the force transformation mechanism being coupled to communicate the pushing force through the outer body to the valve housing to counter the pulling force and communicate the pulling force through the draw screw and clamping assembly to the valve cartridge to cause the valve cartridge to be extracted from the valve housing.

2. A cartridge puller for extracting a valve cartridge from a valve housing, the cartridge puller comprising:

a clamping mechanism having a hooking mechanism for securing the clamping assembly to the valve cartridge, the clamping assembly including a puller body, a pair of hooks pivotally mounted on the puller body to engage and secure the valve cartridge when pivoted to a clamping position, a pair of press pins mounted in the puller body to transmit a clamping force to respective ones of a pair of hooks and a clamping nut threadedly connected to the puller body and disposed to directly engage the pair of press pins to apply the clamping force thereto when tightened;

an outer body adapted to engage the valve housing peripherally of the valve cartridge; and a force transformation mechanism receiving an applied force and transforming the applied force into opposed pushing and pulling forces with a mechanical advantage greater than one, the force transformation mechanism being coupled to communicate the pushing force through the outer body to the valve housing and the pulling force through the clamping assembly to the valve cartridge to cause the valve cartridge to be extracted from the valve housing.

3. A cartridge puller according to claim 1 wherein the draw screw has an end opposite the one end extending from the clamping assembly on a side thereof opposite the hooking mechanism and the force transformation mechanism comprises said opposite end of the draw screw and a puller nut threadedly engaging the draw screw and engaging the outer body to exert opposed relative forces between the draw screw and the outer body when threadedly tightened by rotation on the draw screw.

4. A cartridge puller according to claim 1 wherein the outer body is in the shape of a hollow cylinder having an open end for receiving the clamping assembly and engaging the valve housing and an opposite end adapted to receive the pushing force while facilitating transmission of the pulling force through the draw screw to the clamping assembly.

5. A cartridge puller according to claim 1 wherein the draw screw has an end opposite the one end extending from the clamping assembly on a side thereof opposite the hooking mechanism and the force transformation mechanism comprises a puller nut threadedly engaging the draw screw and wherein the outer body comprises a generally cylindrical hollow shell having an open end for receiving the clamping assembly and engaging the valve housing and an opposite partially closed end engaging the puller nut on an outside surface thereof, the partially closed end having an aperture therethrough for slideably receiving the draw screw.

6. A cartridge puller for extracting a valve cartridge from a valve housing, the cartridge puller comprising:
a clamping assembly having a hooking mechanism for securing the clamping assembly to the valve cartridge, the hooking mechanism including a pair of hooks which are pivotable between a clamping position and a release position, the clamping assembly including the draw screw having a helically threaded puller end and an opposite second end, a generally cylindrical puller body having a hook end connected to the hooking mechanism and having an axially extending central aperture receiving the second end of the draw screw in a fastening relationship with the draw screw extending axially from an end of the puller body opposite the hook end, a pair of transversely extending pivot pins pivotably securing the hooks to the puller body, a pair of axially extending press pins disposed to transmit to respective ones of the hooks a clamping force tending to pivot the hooks toward a clamping position and a clamping nut threadedly engaging the draw screw and engaging the pair of press pins to exert a clamping force thereon when tightened by rotation about the draw screw;
an outer body adapted to engage the valve housing peripherally of the valve cartridge; and
a force transformation mechanism receiving an applied force and transforming the applied force into opposed pushing and pulling forces with a mechanical advantage greater than one, the force transformation mechanism being coupled to communicate the pushing force through the outer body to the valve housing and the pulling force through the clamping assembly to the valve cartridge to cause the valve cartridge to be extracted from the valve housing, the force transformation mechanism including the helically threaded puller end of the draw screw and a puller nut threadedly engaging the puller end of the draw screw.

7. A cartridge puller for extracting a valve cartridge from a valve housing of a hot and cold water mixing valve through an opening therein comprising:
a clamping assembly including a threaded draw screw, a puller body affixed to the draw screw adjacent one end thereof, a pair of hooks mounted to the puller body and being moveable between a position of engagement with the valve housing and a release position, a clamping nut threadedly engaging the draw screw and being bidirectionally moveable axially of the draw screw in response to rotation of the clamping nut relative to the draw screw, and a pair of press pins extending generally parallel to the draw screw between the clamping nut and respective ones of the pair of hooks to communicate axial positioning of the clamping nut to the pair of hooks to control movement of the hooks between the release and engagement positions;
an outer body adapted to slideably receive the draw screw and engage the housing peripherally of the opening through which the cartridge is extended; and
a puller nut threadingly engaging the draw screw on an end of the outer body opposite the mixing valve so as to exert when tightened a first pushing force through the outer body to the valve housing and an opposite pulling force through the draw screw and clamping assembly to the valve cartridge to cause the valve cartridge to be extracted from the valve housing.

8. A cartridge puller for extracting a valve cartridge from a housing of a hot and cold water mixing valve, the cartridge puller comprising:
a clamping assembly including a helically threaded draw screw, a generally cylindrical axially extending puller body having a slotted hook end and an opposite end with a central, axially extending aperture receiving the draw screw with the draw screw extending axially therefrom, the puller body further having defined therein first and second diametrically spaced apart press pin bores extending axially between the slot and the opposite end and first and second diametrically spaced, transversely extending pivot pin bores disposed adjacent the hook end and extending through the slot, the clamping assembly further including first and second pivot pins disposed respectively within the first and second pivot pin bores and extending across the slot, first and second diametrically spaced hooks disposed partially within the slot with hook ends adapted to engage and fasten to the valve cartridge when in the clamping position extending from the hook end of the puller body with the first and second hooks being retained within the slot by the first and second pivot pins respectively and being pivotable about the first and second pivot pins respectively between a release position and a clamping position, a bias spring disposed to bias the first and second hooks toward the release pivot position, first and second press pins disposed respectively within the first and second press pin bores with clamping ends extending from the opposite end of the puller body and hook ends in respective engagement with the first and second hooks to tend to pivot the first and second hooks toward the clamping position, and a clamping nut threadedly receiving the draw screw and bearing against the clamping ends of the first and second press pins;
a generally cylindrical, hollow outer body having an open end for receiving the clamping assembly and bearing against the valve housing and an opposite closed end having a central aperture therethrough slideably receiving the draw screw; and
a puller nut threadedly engaging the draw screw externally of the outer body to create when tightened a pushing force on the outer body and an opposed pulling force on the draw screw, the pulling force being transmitted through the draw screw and clamping assembly to the valve cartridge while the pushing force is transmitted through the outer body to the valve housing to extract the valve cartridge from the valve housing.

9. A cartridge puller according to claim 8 wherein each hook has an L-shaped configuration with a push pin engaging leg extending radially outward and a hooking leg extending axially toward the valve cartridge and terminating in a hook extending in a direction opposite the push pin engaging leg.

10. A cartridge puller according to claim 8 wherein each hook has a generally right triangle configuration with an aperture adjacent a 90 degree corner for receiving a pivot pin and a hook disposed at an extremity of an edge extending from and partially defining the 90 degree corner.

11. A cartridge puller according to claim 8 wherein the first and second hooks each have a protrusion thereon extending inwardly toward each other in facing relationship, the protrusions receiving and supporting the bias spring.

12. A cartridge puller according to claim 11 wherein the bias spring is a hollow tube of a resilient material.

13. A cartridge puller for extracting a valve cartridge from a valve housing of a hot and cold water mixing valve through an opening therein, the cartridge puller comprising:
   a helically threaded draw screw;
   means for releasably hooking onto the valve cartridge that is to be pulled from the valve housing, the hooking means including a puller body secured to one end of the draw screw in a fixed relationship relative thereto, a pair of hooks secured to the puller body and a clamping nut threadedly engaging the draw screw to move axially therealong as the clamping nut is rotated relative to the draw screw, the clamping nut being coupled to position the pair of hooks between positions of engagement and disengagement with the valve cartridge as the clamping nut moves axially with respect to the draw screw and puller body;
   means for transforming an applied force into two opposed pushing and pulling forces with a force mechanical advantage greater than one to create a pulling force upon the draw screw sufficient to remove the valve cartridge from the valve housing notwithstanding an accumulation of material which creates an adherence between the valve cartridge and valve housing; and
   means disposed peripherally of the hooking means for communicating the pushing force to the valve housing to resist the pulling force applied to the valve cartridge as the valve cartridge is extracted from the valve housing through the opening.

14. A cartridge puller for extracting a valve cartridge from a valve housing of a hot and cold water mixing valve through an opening therein, the cartridge puller comprising:
   a helically threaded draw screw;
   means for releasably hooking onto the valve cartridge that is to be pulled from the valve housing, the hooking means including a puller body secured to one end of the draw screw in a nonrotatable relationship relative thereto, a pair of hooks secured to the puller body and a clamping nut threadedly engaging the draw screw to move axially therealong as the clamping nut is rotated relative to the draw screw, the clamping nut being coupled to position the pair of hooks between positions of engagement and disengagement with the valve cartridge as the clamping nut moves axially with respect to the draw screw;
   means for resiliently biasing the hooks toward a position of disengagement with the valve housing;
   means for transforming an applied force into two opposed pushing and pulling forces with a force mechanical advantage greater than one to create a pulling force upon the draw screw sufficient to remove the valve cartridge from the valve housing notwithstanding an accumulation of material which creates an adherence between the valve cartridge and valve housing; and
   means disposed peripherally of the hooking means for communicating the pushing force to the valve housing to resist the pulling force applied to the valve cartridge as the valve cartridge is extracted from the valve housing through the opening.

15. A cartridge puller for extracting a valve cartridge having a pair of spaced apart apertures in an exposed face thereof from a valve housing of a hot and cold water mixing valve through an opening therein the cartridge puller comprising:
   a pair of hooks which are movable between a release position and a clamping position, the hooks having hook ends adapted to extend into the respective pair of spaced apart apertures and then securely and positively grip the face of the valve cartridge when moved to the clamping position while extending through the pair of apertures;
   a puller body moveably supporting the pair of hooks with the hook ends extending therefrom;
   a bias spring disposed to bias the pair of hooks toward a release position;
   a helically threaded draw screw affixed to the puller body and extending from an end thereof opposite the pair of hooks;
   a clamping nut threadedly engaging the draw screw and being operable to generate a clamping force sufficient to move the pair of hooks into clamping engagement with the face of the valve cartridge when tightened;
   a pair of press pins disposed at least partially within the puller body to communicate a clamping force between the clamping nut and the pair of hooks;
   an outer body member having a first end adapted to engage the valve housing peripherally of the valve cartridge and a second end having an aperture therethrough slidably receiving the draw screw; and
   a puller nut threadedly engaging the draw screw to generate opposed pulling and pushing forces sufficient to extract the valve cartridge from the valve housing between the draw screw and outer body member respectively when tightened onto the draw screw.

* * * * *

UNITED STATES PATENT AND TRADEMARK OFFICE
CERTIFICATE OF CORRECTION

PATENT NO. : 4,738,275
DATED : April 19, 1988
INVENTOR(S) : Joseph A. Buckalew

It is certified that error appears in the above-identified patent and that said Letters Patent are hereby corrected as shown below:

Column 1, line 65, "froces" should read --forces--.

Column 5, line 16, "advantages" should read --advantageous--.

Column 5, line 19, "inch" (first occurrence) should read --inches--.

Column 5, line 23, "staring" should read --starting--.

Column 5, line 28, "inch" (first occurence) should read --inches--.

Column 5, line 34, "inch" should read --inches--.

Column 5, line 35, after "3/8" insert --inch--.

Column 5, line 36, after "11/16" insert --inch--.

Column 5, line 44, "1 3/4 inch" should read --1 7/8 inches--.

Signed and Sealed this

Fifteenth Day of November, 1988

*Attest:*

DONALD J. QUIGG

*Attesting Officer*   *Commissioner of Patents and Trademarks*